(12) United States Patent
Dorsey (10) Patent No.: US 8,818,269 B2
(45) Date of Patent: Aug. 26, 2014

(54) PORTABLE ELECTRONIC DEVICE WITH PROXIMITY-BASED CONTENT SYNCHRONIZATION

(71) Applicant: Apple Inc., Cupertino, CA (US)

(72) Inventor: John G. Dorsey, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/689,594

(22) Filed: Nov. 29, 2012

(65) Prior Publication Data

US 2013/0173315 A1 Jul. 4, 2013

Related U.S. Application Data

(63) Continuation of application No. 12/422,196, filed on Apr. 10, 2009, now Pat. No. 8,326,221.

(60) Provisional application No. 61/151,125, filed on Feb. 9, 2009.

(51) Int. Cl.
*H04B 7/00* (2006.01)
(52) U.S. Cl.
USPC .......................................................... 455/41.1
(58) Field of Classification Search
USPC .......................................................... 455/41.1
See application file for complete search history.

(56) References Cited

U.S. PATENT DOCUMENTS

| | | | |
|---|---|---|---|
| 6,782,253 B1 | 8/2004 | Shteyn et al. | |
| 6,874,037 B1 | 3/2005 | Abram et al. | |
| 7,155,199 B2 | 12/2006 | Zalewski et al. | |
| 7,216,109 B1 | 5/2007 | Donner | |
| 7,860,376 B2 * | 12/2010 | Kudo et al. | 386/262 |
| 7,970,350 B2 | 6/2011 | Sheynman et al. | |
| 8,065,389 B2 * | 11/2011 | Tabaaloute | 709/217 |
| 8,326,221 B2 * | 12/2012 | Dorsey | 455/41.1 |

(Continued)

FOREIGN PATENT DOCUMENTS

WO 2006/073983 7/2006

OTHER PUBLICATIONS

McNulty S., "Review: iTunes8", pp. 1-6, Sep. 13, 2008, [online], retrieved Aug. 5, 2009, <URL: http://www.macworld.com/article/135521/2008/09/itunes8.html>.

(Continued)

*Primary Examiner* — Thomas J Hiltunen
(74) *Attorney, Agent, or Firm* — Park, Vaughan, Fleming & Dowler LLP; A. Richard Park (57) ABSTRACT

Systems are provided that support millimeter-wave wireless communications between hosts and electronic devices. A host may be formed using a personal computer associated with a user or computing equipment associated with a public establishment. Content can be automatically synchronized between the host and the user's electronic device over a millimeter-wave wireless communications link in a communications band such as a 60 GHz wireless communications band. Synchronization operations may be performed based on user content preferences. Content preference information may be gathered explicitly from a user using on-screen options or may be gathered by monitoring user media playback activities and media rating activities. The content preference information may be transmitted automatically from an electronic device to a host when the electronic device is brought within range of the host. Synchronization operations may be performed automatically when a user is in proximity of a point-of-sale terminal or ticketing equipment.

20 Claims, 5 Drawing Sheets

(56) References Cited

U.S. PATENT DOCUMENTS

| | | |
|---|---|---|
| 2003/0125057 A1 | 7/2003 | Pesola |
| 2004/0162059 A1 | 8/2004 | Hiltunen et al. |
| 2005/0198208 A1* | 9/2005 | Nystrom ............... 709/219 |
| 2006/0107295 A1 | 5/2006 | Margis |
| 2006/0111047 A1 | 5/2006 | Louberg |
| 2006/0229113 A1 | 10/2006 | Rowse |
| 2007/0073717 A1* | 3/2007 | Ramer et al. ............ 707/10 |
| 2007/0171818 A1 | 7/2007 | Shoji et al. |
| 2007/0275735 A1* | 11/2007 | Estevez ................ 455/457 |
| 2008/0151796 A1 | 6/2008 | Jokela |
| 2008/0207128 A1 | 8/2008 | Mikko |
| 2008/0248781 A1 | 10/2008 | Cedo Perpinya et al. |
| 2008/0256482 A1* | 10/2008 | Lee et al. .............. 715/781 |
| 2008/0272889 A1 | 11/2008 | Symons |
| 2008/0318524 A1* | 12/2008 | Rofougaran ............ 455/41.1 |
| 2009/0009600 A1* | 1/2009 | Butler .................. 348/143 |
| 2009/0031251 A1 | 1/2009 | Kessler et al. |
| 2009/0178118 A1 | 7/2009 | Cedo Perpinya et al. |
| 2009/0232112 A1* | 9/2009 | Trainin et al. .......... 370/337 |
| 2009/0282102 A1 | 11/2009 | Geurts et al. |
| 2010/0216396 A1 | 8/2010 | Fernandez et al. |
| 2010/0223361 A1 | 9/2010 | Corda et al. |

OTHER PUBLICATIONS

Bornholdt C. et al., "60GHz millimeter-wave broadband wireless access demonstrator for the next-generation mobile internet", Optical Fiber Communications Conference. Postconference Technical Digest. Postdeadline papers (IEEE Cat. No. 02CH37339), Opt. Soc. America Washington, DC, USA [Trends in Optics and Photonics Series. (TOPS)], TOPS. vol. 70, Mar. 17, 2002, pp. 148-149, ISBN 978-1-55752-701-1.

Hettak et al., "Millimeter wave mobile radio access system with intelligent antenna and radio on fiber", Wireless Networks, Communications and Mobile Computing, 2005 International Conference on Maui, HI, USA, Jun. 13, 2005, IEEE vol. 2, pp. 1362-1366, ISBN: 978-0-7803-9305-9.

"Draft Standard for Information Technology—Telecommunications and information exchange between systems—Local and metropolitan area networks—Specific requirements" IEEE P802. 11u/D5.0, Feb. 2009, Available in part case: U.S. Appl. No. 12/422,196.

* cited by examiner

PORTABLE ELECTRONIC DEVICE WITH PROXIMITY-BASED CONTENT SYNCHRONIZATION

RELATED APPLICATIONS

This application is a continuation application of, and hereby claims priority under 35 U.S.C. §120 to, U.S. patent application Ser. No. 12/422,196, which is titled "Portable Electronic Device with Proximity-Based Content Synchronization," by inventor John G. Dorsey, which was filed 10 Apr. 2009. This application also claims priority to now-expired U.S. provisional patent application No. 61/151,125, which is titled "Portable Electronic Device with Proximity-Based Content Synchronization," by inventor John G. Dorsey, which was filed 9 Feb. 2009. Both of these applications are incorporated by reference.

BACKGROUND

This invention relates to electronic devices and, more particularly, to electronic devices with wireless communications capabilities such as high-frequency short-range wireless communications capabilities.

Electronic devices such as computers and cellular telephones often use wireless communications circuitry. For example, portable computers and certain handheld devices sometimes have wireless communications circuitry that supports local area network links. Cellular telephones and other devices are capable of handling remote communications with cellular telephone base stations.

In a typical scenario, long-range wireless links such as cellular telephone links are used to handle voice communications. For example, Global System for Mobile (GSM) cellular telephone links can be used to handle cellular telephone calls in the 850 MHz, 900 MHz, 1800 MHz, and 1900 MHz bands. Non-voice data can also be conveyed over 2G and 3G cellular telephone links. However, due to channel capacity constraints, the amount of information that can be transferred over a cellular telephone link in a given amount of time is limited.

Wireless local area network links may be implemented using the popular IEEE 802.11 protocol (sometimes referred to as "Wi-Fi®") in the 2.4 GHz and 5 GHz bands. These links generally offer higher throughput than links that are based on long-range wireless communications such as cellular telephone communications. These wireless local area network links are not, however, able to transfer large data files in short periods of time. As a result, proposed schemes to exploit wireless service advertising and automatic discovery protocols using Wi-Fi links are generally not able to effectively handle large data files.

As a result of the bandwidth constraints of conventional short-range and long-range wireless data links, systems designers are often forced to rely upon wired links. For example, the designers of portable music players typically require users to download music and video files over hardwired links In a common scenario, a user of a music player maintains a music service account on a personal computer. When the user is interested in synchronizing the music player to the personal computer account, the user can connect the music player to the personal computer using a universal serial bus (USB) cable. Once the presence of the hardwired connection between the music player and the personal computer is detected by the music service software running on the personal computer, a data link between the music service application and the music player can be established and downloaded content from the music service account can be transferred to the music player.

This type of approach can be satisfactory, but requires a fair amount of user attention. If a user forgets to connect the music player to the USB cable or if the user is simply too busy to hook up the music player, the desired downloaded content will not be transferred.

It would therefore be desirable to be able to provide ways in which to improve the abilities of a user of a music player or other electronic device with wireless capabilities to wirelessly interact with external computing equipment.

SUMMARY

Systems are provided that support millimeter-wave wireless communications between hosts and electronic devices. The millimeter-wave communications systems may use radio-frequency signals in a millimeter-wave communications band such as the 60 GHz wireless communications band. High-speed transfer operations may be performed automatically whenever an electronic device is brought within a meter or other suitable distance from a host.

In a typical scenario, a host may transmit beacons or may otherwise wirelessly advertise its presence. When an electronic device is in the vicinity of the host, the host and the electronic device may automatically establish a millimeter-wave wireless communications link. The host may then automatically transfer content to the electronic device over the millimeter-wave wireless communications link.

Host services may be provided using a personal computer associated with a user. In this type of arrangement, the user's electronic device may receive content such as downloaded media files in a wireless synchronization operation whenever the electronic device is within range of the personal computer.

The host may also be provided in the form of computing equipment associated with a store or ticketing operation. In these scenarios, a user may be in the vicinity of the host for a particular amount of time to complete a purchase transaction. During the transaction with the store or ticketing establishment, content may be automatically synchronized to the user's electronic device over the millimeter-wave wireless communications link. The synced content may be associated with a store purchase or ticketed service. Transfer speeds may be enhanced using beam steering equipment. For example, a steerable antenna array in the host may be used in transmitting wireless content.

Further features of the invention, its nature and various advantages will be more apparent from the accompanying drawings and the following detailed description of the preferred embodiments.

DETAILED DESCRIPTION

The present invention relates to wireless communications involving systems that contain electronic devices. The electronic devices may use wireless communications circuitry that contains short-range and long-range wireless transceivers and corresponding antenna structures. For example, an electronic device antenna may be used to handle communications for a short-range link such as an IEEE 802.11 link (sometimes referred to as WiFi®) or a Bluetooth® link. An electronic device antenna may also handle communications for long-range links such as cellular telephone voice and data links. To facilitate the rapid transfer of wireless data, the wireless circuitry in the electronic devices may use high-frequency links. For example, some or all of the wireless circuitry in an electronic device may be used to support radio-frequency communications using 60 GHz links (sometimes referred to herein as "millimeter wave links" or extremely high frequency links).

Radio-frequency communications in some millimeter wave bands may be subject to minimal government regulation. For example, in the United Sates and other major regulatory domains, there may be about 7 GHz of continuous millimeter wave spectrum available at 60 GHz. Bands such as these are sometimes referred to as being "unlicensed." Because there are few regulatory requirements when operating in this range, there are few barriers to rapid commercial deployment of services.

Because of the presence of oxygen molecule resonances, wireless communications at 60 GHz are subject to non-negligible atmospheric attenuation when used in long-range outdoor links. This limits the effective range of most 60 GHz links to short distances (e.g., less than 10-15 meters or less). In indoor applications, effects such as free space path loss and scattering due to reflection tend to be more significant factors in determining link performance. Despite these considerations, communications using 60 GHz signals can be used satisfactorily in many situations, particularly over short distances. Signals at 60 GHz have short (millimeter) wavelengths, so compact (millimeter-scale) antennas can be used. This facilitates device miniaturization. Rapid data rates are also possible (e.g., gigabit rates).

Using beam steering and/or the short-range properties of millimeter wave communications, wireless communications schemes in millimeter bands such as the 60 GHz band can be implemented that allow relatively high bandwidth communications links to be formed over short distances without interference from neighboring devices. This allows an electronic device to interact with nearby equipment at high data rates. If desired, wireless communications may be made sufficiently fast that they can be used in place of conventional wired links such as conventional wired universal serial bus (USB).

Millimeter wave communications schemes such as these may be used in various electronic devices and may be used to communicate with a variety of external electronic equipment.

Examples of electronic devices that may include millimeter-wave wireless communications circuits include devices such as a desktop personal computer, a miniature or wearable device, a portable computer or other portable device, a mobile telephone, a music player, a remote control, a global positioning system device, devices that combine the functions of one or more of these devices and other suitable devices, or any other electronic device.

Examples of external host equipment that may interact with an electronic device using millimeter-wave wireless communications include computing equipment installations at a user's home (e.g., a local area network in a house based on one or more personal computers, routers, and other networking equipment), computing equipment in public locations (e.g., computing equipment in a kiosk or point of sale terminal), computing equipment associated with a public or business network (e.g., computing equipment associated with a ticketing counter at a transportation company or computing equipment associated with other companies), etc.

Figure 1:
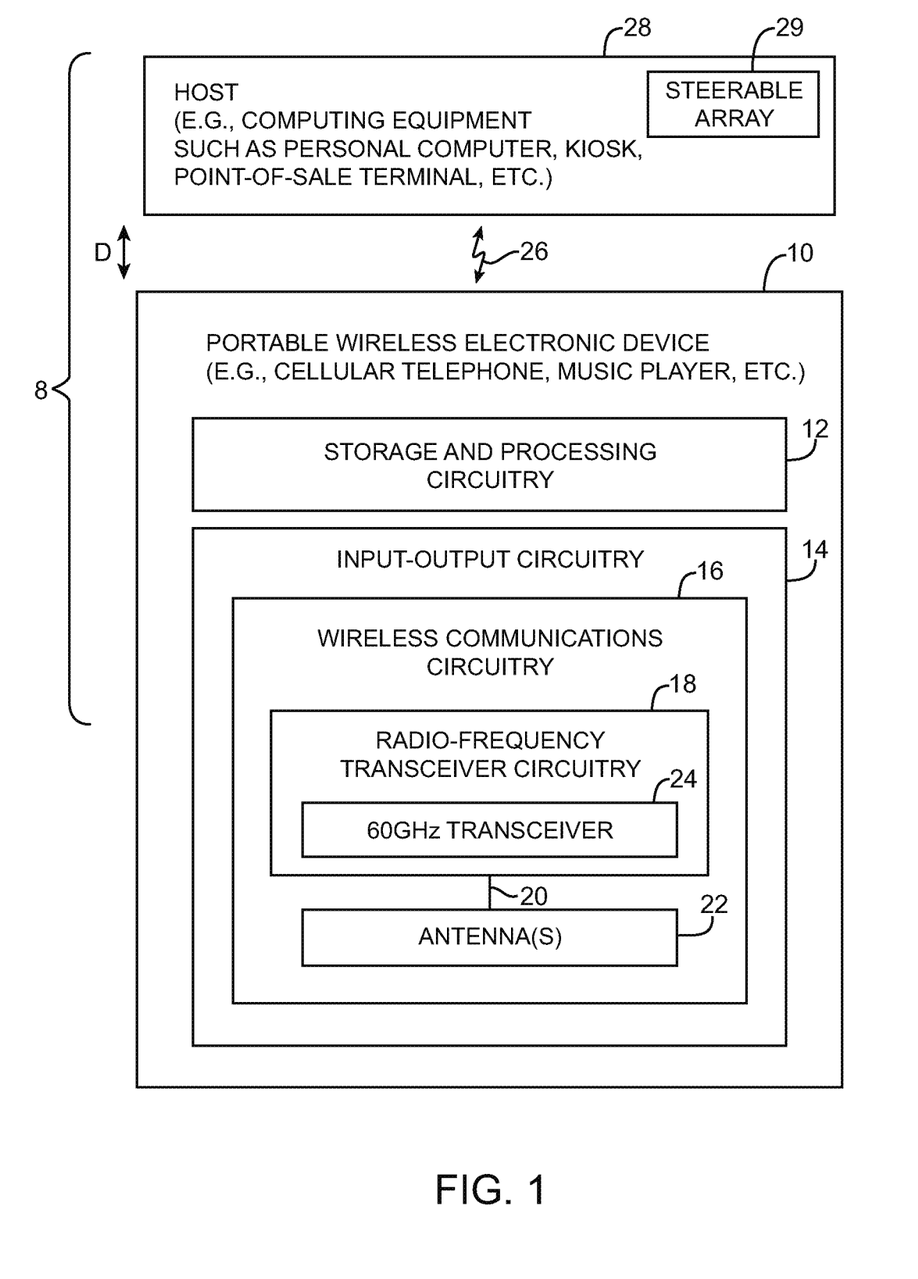
FIG. 1 is a schematic diagram of an illustrative electronic device in which an antenna may be implemented in accordance with an embodiment of the present invention.

A diagram of an illustrative system 8 including an electronic device and external computing equipment that may communicate over a millimeter-wave wireless communications link is shown in FIG. 1. As shown in FIG. 1, system 8 may include an electronic device such as electronic device 10.

Device 10 may include storage and processing circuitry 12 and input-output circuitry 14. Storage and processing circuitry 12 may include hard disk drives, solid state drives, optical drives, random-access memory, nonvolatile memory and other suitable storage. Storage may be implemented using separate integrated circuits and/or using memory blocks that are provided as part of processors or other integrated circuits.

Storage and processing circuitry 12 may include processing circuitry that is used to control the operation of device 10. The processing circuitry may be based on one or more circuits such as a microprocessor, a microcontroller, a digital signal processor, an application-specific integrated circuit, and other suitable integrated circuits. Storage and processing circuitry 12 may be used to run software on device 10 such as operating system software, code for applications, or other suitable software. To support wireless operations, storage and processing circuitry 12 may include software for implementing wireless communications protocols such as wireless local area network protocols (e.g., IEEE 802 protocols such as IEEE 802.15.3 protocols for high-rate personal area networks and the IEEE P802.11ad proposed protocols for very high throughput 60 GHz links), protocols for other short-range wireless communications links such as the Bluetooth® protocol, protocols for handling 3 G communications services (e.g., using wide band code division multiple access techniques), 2G cellular telephone communications protocols, WiMAX® communications protocols, communications protocols for other bands, etc. These protocols may include protocols such as multiple-input-multiple-output (MIMO) protocols that employ multiple antennas to increase data throughput, wireless range, and link reliability.

Input-output devices 14 may be used to allow data to be supplied to device 10 and to allow data to be provided from device 10 to external devices. Input-output devices 14 may include user input-output devices such as buttons, display screens, touch screens, joysticks, click wheels, scrolling wheels, touch pads, key pads, keyboards, microphones, speakers, cameras, etc. A user can control the operation of device 10 by supplying commands through the user input devices. This may allow the user to adjust device settings, etc. Input-output devices 14 may also include data ports, circuitry for interfacing with audio and video signal connectors, and other input-output circuitry.

As shown in FIG. 1, input-output devices 14 may include wireless communications circuitry 16. Wireless communications circuitry 16 may include communications circuitry such as radio-frequency (RF) transceiver circuitry 18 formed from one or more integrated circuits such as a baseband processor integrated circuit and other radio-frequency transmitter and receiver circuits. Radio-frequency transceiver circuitry 18 may include circuitry for handling millimeter-wave radio-frequency transmission and reception operations such as 60 GHz radio-frequency transceiver circuit 24. Circuitry 16 may also include power amplifier circuitry, transmission lines such as transmission line(s) 20, passive RF components, antennas 22, and other circuitry for handling RF wireless signals.

Electronic device 10 may include one or more antennas such as antenna 22. The antenna structures in device 10 may be used to handle any suitable communications bands of interest. For example, antennas and wireless communications circuitry in device 10 may be used to handle cellular telephone communications in one or more frequency bands and data communications in one or more communications bands. Typical data communications bands that may be handled by wireless communications circuitry 16 include the 2.4 GHz band that is sometimes used for Wi-Fi® (IEEE 802.11) and Bluetooth® communications, the 5 GHz band that is sometimes used for Wi-Fi® communications, the 1575 MHz Global Positioning System band, and 2G and 3G cellular telephone bands. Millimeter-wave communications can be handled using one or more antenna structures that are designed to operate at millimeter-wave frequencies. These millimeter-wave frequencies may correspond to radio-frequency communications in a communications band at 60 GHz (e.g., 57-64 GHz in the United States or 59-66 GHz in Europe and Japan).

Millimeter-wave bands and other bands may be covered using single-band and multiband antennas. For example, cellular telephone communications can be handled using a multiband cellular telephone antenna. A single band antenna may be provided to handle millimeter-wave communications. Another single band antenna may be provided to handle Bluetooth® communications. Device 10 may, as an example, include a multiband antenna that handles local area network data communications at 2.4 GHz and 5 GHz (e.g., for IEEE 802.11 communications), a single band antenna that handles 2.4 GHz IEEE 802.11 communications and/or 2.4 GHz Bluetooth® communications, a multiband cellular telephone antenna, and a single band antenna that handles millimeter-wave communications (e.g., at 60 GHz). Single band and multiband antennas that handle other communications frequencies of interest may also be used. These are merely examples. Any suitable antenna structures may be used by device 10 to cover communications bands of interest.

Portable wireless electronic device 10 may communicate with external computing equipment (sometimes referred to as host 28) over wireless communications links such as wireless communications link 26. As with device 10 of FIG. 1, host 28 may include storage and processing circuitry and input-output circuitry (including antenna structures and radio-frequency transceiver circuitry such as the 60 GHz radio-frequency transceiver circuit of FIG. 1).

Wireless communications link 26 may be, for example, a millimeter-wave communications link operating at 60 GHz. In this type of scenario, the maximum effective range of link 26 may be limited (e.g., to a maximum practical distance D). The magnitude of D may depend on the capabilities of device 10 and host 28. In a typical scenario, distance D may be less than 20 meters, less than 15 meters, less than 10 meters, or may be within the range of 1-3 meters or less (as examples). Link 26 may be most effective when device 10 has a clear "line-of-sight" path to host 28, but may also operate under certain non-line-of-sight conditions.

As an example, link 26 may be blocked if host 28 (i.e., the antenna of host 28) is in a separate room or building from device 10 or if there are significant obstructions such as walls or furniture blocking the path between device 10 and host 28. In at least some arrangements, however, device 10 and host 28 may communicate wirelessly over link 26 even if device 10 is hidden from view by less significant obstructions (e.g., when device 10 is within a pants pocket or other clothing worn by a user of device 10 or is in a bag). To support this type of non-line-of-sight channel, in which the free-space path between device 10 and host 28 is at least partly obscured by an object (e.g., clothing), device 10 and/or host 28 may use transceiver and antenna structures that support beam steering (e.g., using a controllable phased array of antennas or other suitable beam steering antenna arrangement). As shown in FIG. 1, for example, host 28 may include steerable antenna array 29. Antenna array 29 may have, for example, 36 individual antenna elements.

In general, however, the sensitivity of host 28 and device 10 and the corresponding maximum permissible operating range D for link 26 may be configured to be relatively larger or smaller by proper selection of the components in system 8. Larger ranges (e.g., greater than 20 meters) may be obtained by using more sensitive transceiver circuitry and larger operating powers and by tolerating lower data rates and more errors. Smaller ranges (e.g., less than 20 meters) may be applicable when operating at gigabit data rates and higher data rates and when operating at relatively lower transceiver powers.

In a typical scenario, device 10 may be a portable electronic device such as a handheld electronic device. As an example, device 10 may be a cellular telephone with music player functionality, a music player, a handheld computer, or other handheld device (as examples). Host 28 may be based on a computer such as a portable computer, a peer device (e.g., another handheld device similar or identical in type to device 10), a network of computers, etc. The computing equipment of host 28 may be associated with the user (home computing equipment), a home office or business (office computing equipment), a public environment (public computing equipment), or any other suitable entity.

Figure 2:
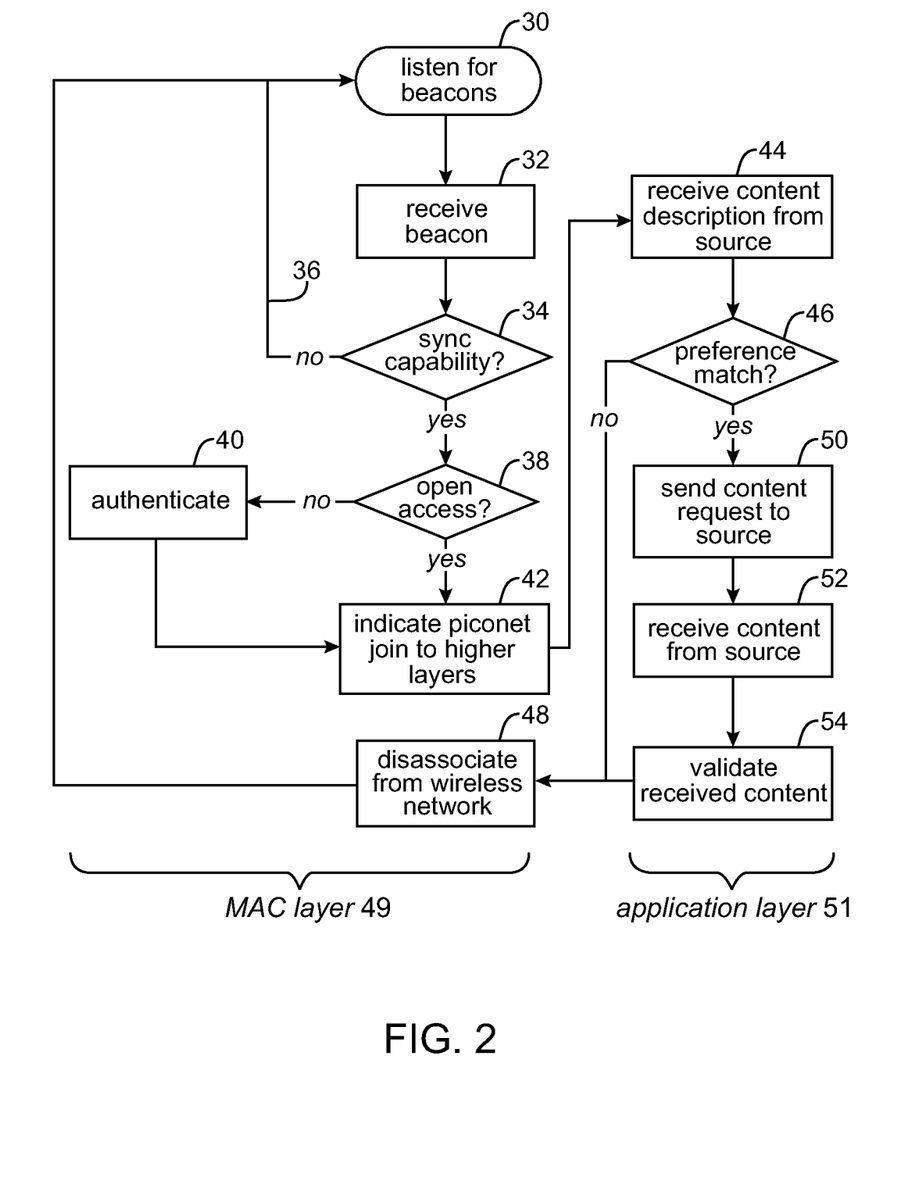
FIG. 2 is a flow chart of illustrative steps involved in operating a system of the type shown in FIG. 1 in accordance with an embodiment of the present invention.

A flow chart of operations involved in using device 10 in system 8 of FIG. 1 is shown in FIG. 2. The diagram of FIG. 2 serves as a protocol state machine diagram in the context of a usage scenario in which device 10 receives content from host 28. Other usage scenarios and techniques for establishing millimeter-wave links are also possible. The scenario of FIG. 2 is merely illustrative.

As illustrated by step 30, as a user carries device 10 to various locations, device 10 may listen for beacons from a host such as host 28 of FIG. 1 that is within range of device 10 (e.g., closer than maximum operating distance D). If desired, beacon arrangements can involve the transmission of beacon signals from device 10 in addition to or instead of transmitting beacon signals from host 28. Arrangements in which hosts such as host 28 transmit beacon signals are sometimes described herein as an example. Other mechanisms for making capability announcements may be used if desired. For example, capabilities may be advertised using the Generic Advertisement Service defined by IEEE 802.11u.

Host 28 may use its internal storage and processing circuitry and its wireless communications circuitry to transmit radio-frequency beacon signals in the 60 GHz communications band (as an example). Out-of-band beacons may also be transmitted.

When a beacon is received (step 32), device 10 can respond, thereby notifying host 28 of the presence of device 10 within distance D. At this stage, both host 28 and device 10 can conclude that device 10 is within range of host 28. Proximity-based services can then be delivered.

Different electronic devices and hosts may have different types of capabilities. Accordingly, it may be advantageous to permit "discovery" of the capabilities of host 28 by device 10 and vice versa. For example, at step 34, device 10 can determine whether host 30 is of the type that permits synchronization of music files and other content (as an example). If not (e.g., because host 28 is a wireless computer monitor or other "dumb" device), processing may return to step 30, as indicated by line 36.

If, however, a synchronization capability is present (e.g., host 28 is a public host located in a store), processing may continue to step 38. At step 38, device 10 may determine whether the in-range host 28 permits open access (i.e., access without authentication). Some services may desire to provide services to all in-range devices without authentication. In this situation, processing may proceed directly to step 42. Other services, however, may require that device 10 authenticate to host 28 (step 40), before services are made available (step 42). If desired, authentication operations during step 40 may be performed using an out-of-band channel.

During the operations of step 42, a bidirectional wireless communications link such as link 26 of FIG. 1 may be established between host 28 and device 10. In particular, device 10 may be joined to a wireless network that includes host 28. Link 26 may, for example, be a 60 GHz link. The operations of step 42 may be performed after MAC layer 49 notifies an appropriate content syncing application on device 10 (application layer 51) that wireless network association has occurred. The application can then establish communication with a peer application on host 28. With one suitable arrangement, the host application may provide service on a suitable TCP or UDP port. The device application may use a service discovery protocol to locate the host application. With another suitable approach, the device application may use the multicast Domain Name System (mDNS) to locate host 28. Once host 28 has been located and identified, device 10 may initiate a transport layer session over link 26 that links the device and host applications.

At step 44, host 28 may provide device 10 with information on the content available from host 28. For example, host 28 may provide device 10 with a list of available songs or videos or may otherwise send device 10 a description of the content that is available for sync. The description may include all content available at host 28 or may be selective. With one suitable arrangement, the content source application running on host 28 may be a media management application such as the iTunes® program from Apple Inc. of Cupertino, Calif. The media management application may be used to manage content on a user's electronic device 10. With this type of arrangement, the media management application may only inform device 10 of new content that has become available since the last sync.

At step 46, device 10 can determine whether any of the content that is being made available by host 28 matches the user's preferences. These preferences may be supplied in real-time (e.g., the user may be prompted to make content preference selections by device 10 using an on-screen arrangement) or a user may interact with device 10 in advance to inform device 10 of the user's preferences. User preference information may be provided to device 10 explicitly (e.g., the user may click on a "favorite song genre" option) or may be determined by inference (e.g., by monitoring which songs the user listens to most frequently as with the Genius feature of the iTunes® program of Apple Inc., Cupertino, Calif.).

If there is no preference match at step 46, processing may proceed to step 48. At step 48, device 10 may disassociate itself from the wireless network (i.e., device 10 may break the wireless communications link that was established by host 28). Device 10 may then return to step 30 to listen for new incoming beacon signals.

If there is a preference match at step 46, processing may proceed to step 50. At step 50, device 10 can send a wireless content request to host 28 over link 26. The wireless content request may include, for example, a request that particular media files be transferred to device 10 from host 28 over link 26. The requested media files may be, for example, the songs from the broadcast list of step 44 that were determined to match the user's preferences during the operations of step 46.

At step 52, host 28 may transmit the songs, videos, or other media files or digital content to the user at device 10 over link 26. Link 26 may support a relatively high data rate (e.g., hundreds of megabits per second or gigabits per second or more), allowing the relevant content to be delivered in a relatively short amount of time (e.g., less than a minute, less than 30 seconds, less than 10 seconds, or a few seconds or less, as examples).

During the operations of steps such as steps 44, 46, 50, and 52, device 10 may decide which of the available content should be received from host 28 and/or host 28 may decide which of the available content should be transmitted to device 10. For example, device 10 may request the transmission of specific content from host 28. In particular, an application on electronic device 10 may determine which items, if any, to sync. The application may also decide which order should be used in syncing the items that are to be transmitted. The application on device 10 may consider several factors in choosing content, such as price, genre, rights management status, and the probability that the sync will successfully complete before the sync process will be interrupted by moving device 10 out of range of host 28.

The application on device 10 may model the user's content preferences using explicit information provided by the user such as user-entered preferences for genres, performers, series, labels, studios, maturity ratings, tracks, albums, and compilations. When the application on electronic device 10 encounters a host that offers content consistent with these predefined user preferences, content may be automatically synced to the extent possible by availability on the host and the condition of link 26.

The application on electronic device 10 may also infer the user's content preferences without receiving explicit user preference entries. For example, the application on electronic device 10 may analyze the content that is already in the user's library (on device 10 and/or host 28). This analysis may reveal, as an example, the frequency of playback of different media items and any corresponding ratings information that the user has supplied to indicate likes or dislikes associated with the played back media. The application on electronic device 10 may then constructs a model of the user's preferences by training a classifier on the existing content (i.e., user preferences can be produced from modeling and other analysis operations based on user activity and ratings). Content discovered on the host 28 can be compared to the user preferences that have been produced by this type of preference analysis (step 46). By requesting only content that matches the user's preferences, transmission times can be reduced.

During step 50, the application on electronic device 10 may provide a description of desired content to host 28. This description may be sent in the form of a list enumerating requested items (e.g., by filename). If desired, a content request description may be more open-ended. For example, a content request may include information that characterizes the user's content preferences (either those gathered explicitly or inferred). With this type of approach, the application on host 28 may send items to device 10 that are consistent with the listed preferences.

If desired, device 10 may send digital rights management (DRM) information to host 28 as part of a content request. This DRM information may include account identification information for making purchases through the media management application (i.e., for making purchases in the iTunes® store in the iTunes® program of Apple Inc.). The application on host 28 may use DRM information that is supplied in this way to protect content from unauthorized copying. The DRM information may also be used for billing purposes. If desired, DRM information may be used to enforce time limits on permitted content usage. For example, a user may receive content at a point of sale terminal at an establishment such as a coffee house. The content may have associated DRM information specifying an allowed usage time period. After one or two hours or other suitable length of time, the user's right to view the content will expire. As another example, a user might receive an airline entertainment program from a millimeter wave link that is associated with an airline ticket counter or kiosk. After an appropriate time period has passed or after a particular event has occurred (e.g., the user's flight has landed at its destination), the entertainment program will expire.

During the sync process of step 52, host 28 may modify or allow modification to the content being synced. Host 28 may determine that some content cannot be completely transmitted to device 10 before the wireless link fails and can take appropriate action such as scheduling transfer of this content with a low priority. Host 28 may use observations of user mobility in determining how to schedule content for syncing. If desired, host 28 may use knowledge of a transaction schedule in scheduling sync operations. For example, host 28 may use knowledge of the typical steps involved in a retail purchase transaction to determine how to schedule content delivery. If host 28 determines that the user is likely to complete a retail transaction in a particular period of time and therefore will likely move out of range of host 28 before a large item can finish syncing, host 28 may decide not to begin syncing that item. Rather, host 28 may substitute smaller content items or may modify the desired large content item to allow faster transmission. As part of the sync process, the host application may transcode content. The host application may, for example, transcode content items to reduce the size of these items for syncing.

Host 28 may also choose to allow some errors introduced during transmission over link 26 to remain uncorrected, as error correction operations (such as transmission retry events) may consume more time than is available during a short sync operation. Host 28 may, for example, configure MAC layer 49 to use unequal error protection (UEP) schemes for transmitted frames. UEP schemes allow certain types of errors to be passed to a receiving application. For example, low-order bits in pixel data for video items may be allowed to become corrupted without concern about significant distortion to the video image. The UEP policy that is used may permit errors in these bits without triggering a retransmission attempt.

After device 10 has received the appropriate content from host 28 over link 26 at step 52, the received content may be validated at step 54. As an example, the validation process may involve checking received media file filenames against a list of expected filenames. More extensive checking operations may also be performed. For example, device 10 and/or host 28 may check that appropriate digital rights management (DRM) credentials are present (e.g., that device 10 is authorized to receive the synced content). If desired, device 10 can be configured to only accept content from host 28 that has been signed by a trusted third party (as an example). In this type of configuration, the third party would be responsible for examining content for potential defects. The signature of the third party may serve to endorse the content on host 28 as being safe.

If the media files have been improperly or incompletely loaded or are not properly signed, replacement content can be requested and delivered from host 28. Otherwise, processing can continue to step 48, where device 10 and host 28 can break wireless link 26.

As the example of FIGS. 1 and 2 demonstrates, millimeter-wave wireless syncing operations may involve three layers of the protocol stack: the physical layer, the medium access control (MAC) layer, and the application layer.

At the physical layer, system 8 may use millimeter waves (e.g., radio-frequency signals at 60 GHz). System 8 preferably allows sync operations to be performed in an unobtrusive manner. This may be accomplished by leveraging the ability of wireless link 26 to function in non-line-of-sight (NLOS) channels. When device 10 is placed in a pocket or bag, there is no line-of-sight radio-frequency (RF) path that dominates the link between transmitter and receiver. As a result, link 26 may be impaired by high delay spread, frequency-selective fading, and other effects. This may impose constraints on the radio and antenna system that is best to use for system 8, as not all millimeter-wave designs will perform equally well in such environments.

With one suitable arrangement, host 28 and device 10 may use wireless circuitry that implements orthogonal frequency-division multiplexing (OFDM) as a modulation technique to combat NLOS channel impairments. Because wireless circuitry for implementing OFDM techniques requires more circuit area and power than wireless circuitry for implementing simpler techniques, a suitable alternate arrangement involves using wireless circuitry in system 8 that implements single-carrier modulation (SCM) techniques. SCM techniques are more vulnerable to frequency-selective distortion than OFDM techniques, so receiver equalization and transmitter predistortion techniques may be used in SCM transceivers. Because SCM transceivers tend to dissipate less energy than OFDM designs that offer similar throughput, SCM systems can be used satisfactorily in small devices 10 such as phones and media players. If desired, electronic device 10 may contain wireless circuitry that implements an asymmetric transceiver with a SCM transmit path and an OFDM receive path. This type of circuit may reduce circuit complexity compared to an all-OFDM design.

Asymmetric designs such as these may provide the robustness of an OFDM system in the direction from the content source to the mobile device (where high performance is required or at least highly desired). Data transfers in the reverse direction may involve primarily low-rate management signaling operations and may use of forward error correction techniques. In one suitable configuration, a low-bandwidth single-carrier waveform can be replicated throughout the channel in the expectation that at least one copy will escape frequency-selective fading.

Millimeter-wave OFDM designs can support higher-order modulations than their SCM counterparts. (For example, 16-QAM or 64-QAM may be supported instead of BPSK.) As a result, the physical data rates achievable with OFDM implementations can be higher. Examples of higher data rates that may be provided include data rates of greater than 1 Gbps, greater than 2 Gbps, greater than 3 Gbps, greater than 4 Gbps, greater than 5 Gbps, greater than 6 Gbps, greater than 7 Gbps, greater than 8 Gbps, etc.

Even with protocol overhead added, the effective throughput of this type of system may be greater than the data rate that is associated with typical electronic device storage media.

If desired, system 10 may use a "pulsed load" arrangement in which the content to be synced is sent from host 28 to device 10 in short bursts. The bursts may be sized to fit in fast buffer memory (storage 12) at electronic device 10 and can therefore be transmitted at a relatively high rate. Following each burst, while the electronic device transfers the buffer contents to slower storage, the transceivers on both the host and device sides of link 26 can enter low-power idle states. This type of arrangement can help to reduce average electrical power consumption and may be used to help meet thermal management constraints.

The data rates supported by millimeter-wave transceivers tend to be highest at close range. For in-pocket or in-bag channels, maximum performance may only be available at transmitter-receiver separations of about one meter (as an example). This characteristic of link 26 does not imply, however, that link 26 will be unusable at greater distances (e.g., 10-20 meters). In a typical operating environment, link 26 may support lower data rates at separations of several meters or more (although most commonly this rate will drop significantly at distances of more than about ten meters). If desired, automatic handover operations may be performed as link 26 degrades. As an example, link 26 may automatically switch from using 60 GHz communications to using WiFi® communications at 2.4 GHz and/or 5 GHz (e.g., IEEE 802.11) as the range for using 60 GHz communications becomes too large. The handover procedure may be used in both directions (e.g., moving out of range and moving back into range).

In a typical usage scenario, device 10 begins the process of wireless network association, service discovery, authentication, and other such tasks while the user is approaching the content source. These operations do not require high throughput and can be conducted using a slower and more robust modulation and coding scheme of the type appropriate for operation over a greater distance. By the time the user brings device 10 into the range of host 28, setup tasks may already have been completed. In this type of situation, the sync process can begin immediately at a high data rate.

To overcome the attenuating effects of a pocket or bag on RF signals, a beam steering antenna array may be used (e.g., as part of wireless communications circuitry 16 in device 10 and/or the corresponding wireless communications circuitry of host 28). Such arrays can exhibit up to 30 dB of gain in millimeter-wave implementations (albeit typically with the use of physically large structures). To allow the size of device 10 to be minimized, it may be desirable to use a potentially complex steerable array in host 28, while using a less complex steerable array or a non-steerable setup in device 10 (e.g., a passive antenna, a diversity antenna, or a relatively simple steerable array). The optional use of a steerable antenna array in host 28 is indicated by steerable array 29 of FIG. 1. The optional use of a passive antenna, a diversity antenna, or a relatively simple steerable antenna array in device 10 is indicated by antennas 22 of FIG. 1. If desired, a sectored antenna may be used in which each antenna sector can be selectively switched into or out of use. By controlling the active antenna sector, antenna gain may be provided in a selectable direction.

Using a combination of passive and/or active antenna arrays such as a steerable array in host 28 and a less complex antenna in device 10, link 26 may receive the benefit of the array gain for content transmission while allowing device 10 to remain small. If desired, both host 28 and device 10 may implement a closed-loop beam steering protocol to periodically retrain the array or arrays that are in use.

Wireless syncing operations in system 8 also involve activities at the medium access control layer. Wireless networks may be controlled by a device known as the wireless network controller or "controller". The controller bears responsibility for scheduling access to the medium, and as such, can incur higher energy costs during operation. To allow device 10 to conserve energy, it may be desirable for host 28 to assume the role of controller in system 8. With this type of arrangement, host 28 may maintain the wireless network even when there are no devices 10 in range. The controller implemented on host 28 may allow any device 10 to join the wireless network. Alternatively, the controller implemented on host 28 may restrict wireless network access to devices that properly authenticate to host 28 (i.e., host 28 may require authentication for security purposes). When host 28 is associated with a public environment (e.g., host 28 is implemented at a retail point-of-sale terminal or ticket counter equipment), the controller implemented on host 28 may allow open access to any in-range electronic device 10. When host 28 is associated with a more private environment such as a user's personal computer, host 28 may require authenticated access.

Any suitable authentication method may be used by host 28 to restrict access to hosted content. The authentication method may, for example, use a symmetric-key protocol such as that specified by the Advanced Encryption Standard (AES), or may rely on other secure techniques. Once authenticated to host 28, host 28 and device 10 may use encryption (e.g., MAC-layer encryption) to protect communications over link 26 from eavesdropping.

A given device 10 may detect many wireless networks as the user moves from location to location. In this type of environment, content delivery may use an automatic proximity-based delivery mechanism (sometimes referred to herein as opportunistic wireless syncing). While some of the detected wireless networks may support opportunistic wireless syncing, others may not. Examples of wireless systems that may not support opportunistic wireless syncing may include wireless displays, wireless docking equipment, and other such components.

It may be useful for electronic device 10 to be able to discern differences such as these between wireless networks without having to join each wireless network. This may be accomplished by requiring each host to broadcast its syncing capability to nearby devices 10 (e.g., in periodically transmitted unencrypted beacon frames).

When host capabilities are broadcast in this way, electronic devices 10 may attempt to join only those wireless networks in which the sync capability is indicated to be present. Sync capability announcements may include any suitable information on the broadcasting host. For example, sync capability announcements (beacons) may include information about the genres of content available, the size of the content, content costs, expected transfer times, rights management details, or other information affecting the decision by device 10 to accept the sync content. When content descriptions such as these or other information on which media files are available at host 28 is included as part of a beacon, content listings can be received at step 32 of FIG. 2 instead of at step 44 of FIG. 2 (if desired).

Once device 10 establishes link 26 with host 28 and thereby joins the wireless network hosted by the host 28, device 10 may use application-layer communications to perform a sync. The high-level protocol state machine of FIG. 2 distinguishes between actions associated with MAC layer 49 and those associated with application layer 51. Once the MAC layer notifies higher layers that a successful wireless network join has occurred, an application on device 10 may interact with an application on host 28. During this interaction, the respective applications may exchange information about available content, may transfer preferred content, and may validate the content.

Schemes such as the wireless content discovery and transfer scheme of FIG. 2 may be used in a variety of contexts to exploit the millimeter wave capabilities of device 10. For example, millimeter-wave wireless capabilities may be used in private contexts such as when a user brings device 10 into the proximity of a networked home computer, in business contexts such as when device 10 is brought within range of an office-based host, or in public contexts such as those where host 28 is associated with ticketing counters and other establishments.

One of the advantages of millimeter-wave communications schemes such as schemes using the 60 GHz band is the potentially rapid data transfer rates that may be achieved. There may be, for example, 7 GHz of continuous spectrum available in each of the major regulatory domains at 60 GHz, allowing gigabit per second data rates to be supported without requiring the use of excessively complex radio designs. Because content syncing operations can be proximity-based, the user experience when using an electronic device that is capable of millimeter-wave communications may be enhanced.

Conventional content syncing schemes involve three physical actions. First, a mobile system must be removed from a pocket, bag, or case. Second, the system must be attached to an electromechanical interface such as a dock that is connected to a computer. Third, depending on a user's software configuration, the user may be required to actively instruct the computer to begin the sync process. At this point, media such as podcasts, television programs, and movies can be transferred to the mobile system. Because the computer can autonomously acquire content published on the Internet, it is possible that new content will be transferred every time syncing occurs. However, because modern audio and video files tend to be large, system bottlenecks can frustrate the user in conventional systems. A typical forty five minute television program encoded for playback on a music player such as the iPhone® cellular-telephone-based media player or the iPod® media player from Apple Inc. of Cupertino, Calif. consumes about 500 MB of storage capacity. Even assuming ideal conditions and no other network or I/O limits, conventional music players such as these typically require at least four minutes to transfer this amount of data using commonly-available IEEE 802.11 (Wi-Fi®) links. Delays of this length can be unacceptable in many circumstances, so conventionally such music players generally restrict synchronization operations to configurations in which faster wired connections are available.

With millimeter-wave systems such as system 8 of FIG. 1, link 26 may be configured to support high-speed wireless communications (e.g., one gigabit per second of usable throughput). In this type of environment, a 500 MB television program or other media file can be transferred in about four seconds. This makes wireless content syncing feasible and desirable in a wide variety of situations.

For example, using an arrangement of the type described in connection with FIG. 2, content can be synchronized automatically. Whenever a user of device 10 remains motionless for a sufficiently long period of time in the proximity of a suitable host 28, content can be delivered automatically over a wireless link. For example, whenever a user of device 10 stands still for 5-10 seconds within distance D of host 28, there may be an opportunity to deliver content over link 26. This may happen without active user involvement or when a user responds to an automatic on-screen prompt (as examples).

Links such as link 26 may be established whenever a user stands near an appropriate content sourcing device (host 28). The content sourcing device may be the user's personal computer or computing equipment that is located in a location in which the user performs everyday activities (e.g., shopping in a store, visiting the user's office, etc.). The user may set up preferences in advance (e.g., to opt-in to receiving wireless content), but advantageously need not necessarily take actions when device 10 comes within range D of host 28 (unless desired). Consider, as an example, a home or office environment. In this type of environment, a user may sit at a desk briefly before heading to another venue, such as a meeting or dinner. In the time that it would normally take to scan an email inbox or consult a day planner, a full-length news or entertainment program can be automatically transferred to the user's mobile device in system 8. Such opportunities may occur often, so it is not, in general, critical that every transfer complete before the user moves away from the desk. Moreover, it may be a sufficient goal to transfer at least some new content onto the device. It need not be necessary to ensure the successful complete transfer of any particular specific content in this type of automatic synchronization arrangement.

If a user prefers that certain content be synced during such wireless syncing opportunities, several options are available. For example, the user may provide device 10 with content preferences or other wireless content transfer settings. Using these wireless settings, device 10 can prioritize classes of content in advance or can interact with host 28 (and the user if desired) at sync time to ensure that the transfer has completed before the user has begun to walk out of range of host 28.

An example of flexible scheduling involves the situation in which multiple items are available for syncing. In this type of scenario, device 10 may prioritize using shortest-time-to-completion-first scheduling techniques. Such techniques involve transferring small items before large ones, because smaller items generally are associated with lower risks of interruption during transfers.

Preferably, the user need not be required to interact with device 10 at any point during a sync operation. There will typically be several opportunities over the course of a day for a 5-10 second transfer, so there is generally no need to draw a user's attention to the millimeter-wave wireless syncing operations of device 10. With a typical millimeter-wave wireless syncing arrangement, all three of the physical actions associated with conventional wired syncing operations are eliminated. In particular, because transfers are made wirelessly, device 10 may remain in a user's pocket or bag. There is also no need for the user to make a hardware connection with a dock or cable connector. Moreover, device 10 can respond to beacons automatically under automatic software control. Because the software on device 10 can initiate transfers automatically, the user need not interact with device 10 during syncing (unless desired).

Figure 3:
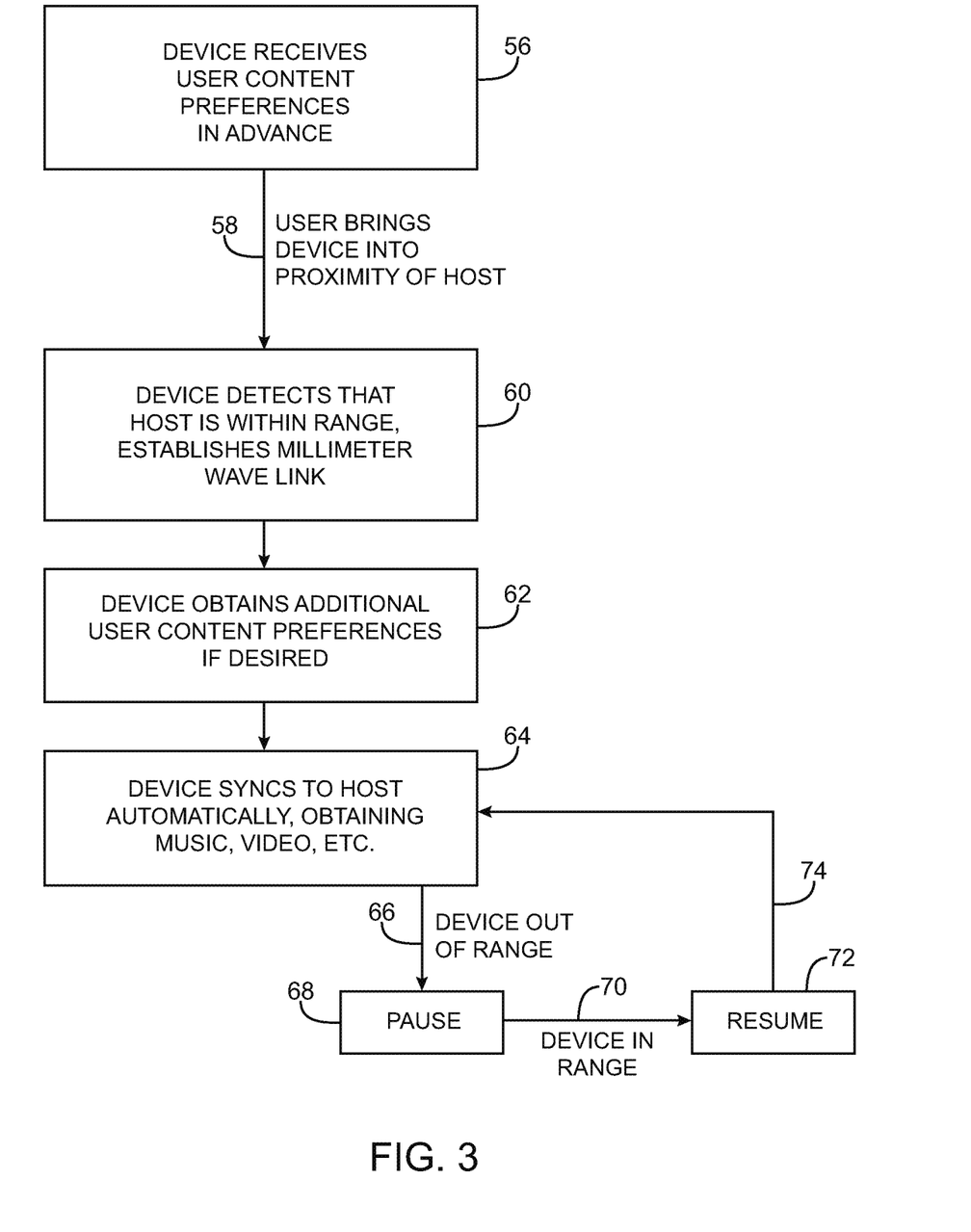
FIG. 3 is a flow chart of illustrative steps involved in using a system of the type shown in FIG. 1 to synchronize content between a host such as a user's personal computer and an electronic device over a millimeter wave wireless link in accordance with an embodiment of the present invention.

Illustrative operations involved in this type of usage scenario are shown in FIG. 3. As shown in FIG. 3, a user may, at step 56, optionally establish content preferences for syncing in advance (i.e., before device 10 is in range of host 28). These content preferences may be established by interacting directly with device 10 or may be established by interacting with a personal computer (e.g., host 28) and subsequently transferring the content preferences that were provided to the personal computer to device 10. As an example, a user may explicitly or implicitly inform music player software on a host computer of the user's musical tastes. These content preferences may then by synced to device 10 using a wireless or wired connection. During the process of step 56, device 10 may present the user with on-screen options to which the user may respond. For example, device 10 may display options on a touch screen that the user can click on to choose which genres of music the user prefers (as an example). Content preferences can also be inferred automatically by device 10 based on the frequency with which the user listens to particular songs, etc.

As indicated by arrow 58, a user who has device 10 in a pocket or bag may, at some point after establishing the content preferences at step 56, bring device 10 within distance D of host 28.

Using beacons of the type described in connection with FIG. 2 or other suitable communications techniques, device 10 and host 28 can automatically detect when device 10 is within range and can take appropriate steps to establish a millimeter wave wireless link such as link 26 of FIG. 1 (step 60).

Following establishment of link 26, device 10 can optionally ask the user for additional content preference information. For example, device 10 can issue an audio alert that the user can respond to by pressing on on-screen options. The alert may inform the user that a sync operation is about to automatically begin. The on-screen options may allow the user to prioritize sync operations (e.g., by skipping video sync operations in favor of music sync operations, etc.). The use of on-screen options and other interactions with the user at step 62 to obtain additional syncing instructions is merely optional. The user may, if desired, be presented with no audible or visual indications that syncing is about to take place, thereby making the syncing operation less obtrusive.

At step 62, device 10 may perform syncing operations automatically over millimeter-wave link 26. Only a relatively short time is necessary for most syncing when link 26 has a sufficiently high bandwidth (e.g., gigabits per second or more). Nevertheless, if device 10 is moved out of range during the syncing process as indicated by line 66, device 10 and host 28 may pause the syncing process temporarily (step 68). When device 10 and host 28 again come within range of each other as indicated by line 70, syncing may be resumed (step 72) and processing may loop back to step 64, as indicated by line 74. During the sync operations of step 64, content is transferred from host 28 (e.g., the user's home or office computer) to device 10. This content typically includes media files such as song and video files, but may also include email contacts and other contact information, photos, etc.

Figure 4:
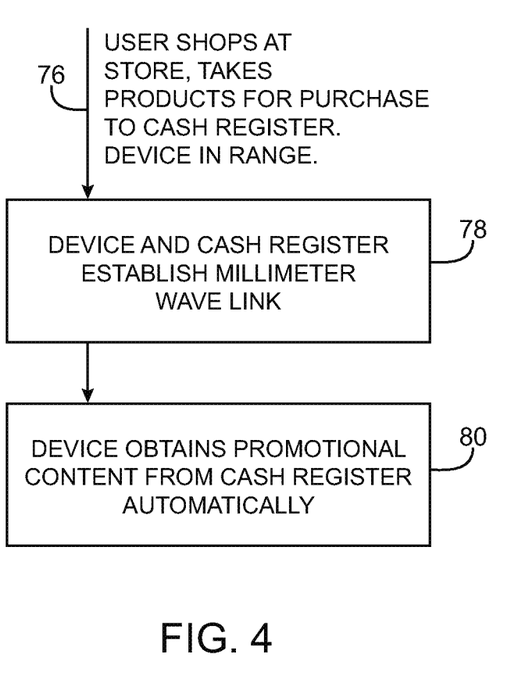
FIG. 4 is a flow chart of illustrative steps involved in using a system of the type shown in FIG. 1 to synchronize content between a host such as a point-of-sale terminal in a store and an electronic device over a millimeter wave wireless link in accordance with an embodiment of the present invention.

Another possible usage scenario involves a point-of-sale location. This type of scenario is illustrated in FIG. 4. As shown by line 76 of FIG. 4, a user may shop in a store for items to purchase. Once the user has finished browsing in the store or when the user has decided to make an order that requires the user's presence at the store's point-of-sale terminal, the user may approach the store's point-of-sale terminal (i.e., the cash register).

A user may, for example, reach the front of a queue at a retail store. Once at the front of the line, the user may stand in front of a cashier while making a purchase. While the usual steps in the transaction are taking place such as placing an order or scanning a purchased item, locating money, and printing a receipt, device 10 will be located within distance D of the cash register (i.e., its antenna array or other antenna).

The cash register in this type of arrangement may have wireless computing equipment that serves as host 28. Because device 10 and host 28 (i.e., the computing equipment associated with the cash register) are within range of each other, a wireless link such as millimeter-wave link 26 of FIG. 1 may be established at step 78.

During the point-of-sale transaction, the cash register (or other point-of-sale equipment) can automatically synchronize content to the user's device 10, as indicated by step 80. The user need not consciously interact with device 10 while the wireless transfer from the point-of-sale terminal equipment is taking place. Rather, device 10 can remain in a pocket or bag. This is because the typical transfer time for the syncing operation will be less than that needed to complete the purchase transaction (e.g., 30 seconds or less, 10 seconds or less, etc.). The user also need not interact with the cash register. The synchronization can be automatically triggered due to the presence of the user and device 10 near the register (i.e., so the device 10 is within distance D of host 28, as described in connection with FIG. 1). Large files (e.g., large video files or large collections of music files) can be transferred during syncing.

In general, any suitable content may be transferred during a purchase transaction of this type. For example, the cash register equipment can be used to transfer promotional content to device 10.

As an example, consider a user making a purchase at a cafe. The cafe may distribute a sample music album for customers to enjoy while in the store. The music album may contain promotional messages, may be provided as a temporary trial version, or may be provided for free. In general, any content that is provided by the cafe may be free for the customer, so that the customer need not be alerted to the sync operation. The free content may, if desired, expire as with a rental model or temporary trial. After a given number of in-store purchases have been made, the customer may become eligible to receive associated free wireless content over link 26 (e.g., when making a subsequent purchase). The cash register in the store can automatically keep track of the number of times that the user visits the store. After the store has been visited on ten different days (as an example), a free song or other promotional content may be automatically loaded onto the user's device over link 26, without any need to alert the user.

If desired, a cashier at the cash register can be notified during step 80 that the customer has a device capable of accepting certain content and can offer to add the cost of the content to the user's bill. Content syncing at step 80 can occur in parallel with a transaction that the user is already performing (e.g., purchasing a product), so there will generally be little or no need to change to the normal flow of the transaction.

If desired, the user may supply device 10 or the host with information specifying the user's preferences as to which types of content are to be transferred from the cash register. Preference information may be supplied in real time or may be supplied to the store or device in advance.

Wirelessly transferred content can augment a user's main purchase. This type of scenario may arise in the context of purchasing a ticket at a ticket counter. The ticket counter may have ticketing equipment such as a point-of-sale terminal that issues tickets. This point-of-sale terminal may have computing equipment that serves as host 28. The ticketing equipment may be associated with transportation services (e.g., bus tickets, train tickets, car tickets, plane tickets, boat tickets, etc.), may be associated with tickets for cultural events (e.g., museum tickets, amusement park tickets, concert tickets, theater tickets, movie tickets, etc.), or may be associated with any other suitable product or service.

Figure 5:
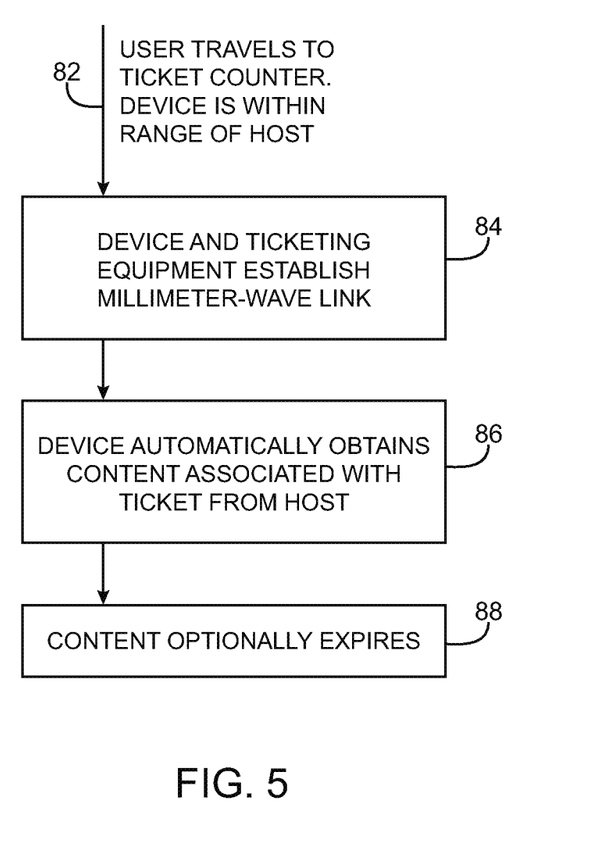
FIG. 5 is a flow chart of illustrative steps involved in using a system of the type shown in FIG. 1 to synchronize content between a host such as ticketing counter equipment and an electronic device over a millimeter wave wireless link in accordance with an embodiment of the present invention.

Consider, as an example, a scenario in which a user is visiting an establishment such as a museum that requires a ticket. When the user is purchasing a ticket for the museum, a guided tour media file may be automatically transferred to device 10. By automatically transferring the guided tour to the mobile device during the admission transaction, it is not necessary for the user to make an affirmative decision to obtain the content.

Steps involved in operating device 10 and host 28 in this type of scenario are shown in FIG. 5. At step 82, a user may travel to a ticket counter to purchase a ticket. The ticket may be needed for transportation, admission to a venue, or any other purpose. The user may carry device 10 in a pocket or bag. As the user approaches the ticket counter, device 10 is brought within range of host 28 (i.e., ticketing equipment at the counter), as indicated by line 82.

When device 10 and the ticketing equipment are within range of each other (i.e., less than distance D of FIG. 1), device 10 and the ticketing equipment may establish millimeter-wave communications link 26 (step 84).

At step 86, while the user and device 10 are in the vicinity of the ticketing counter (host 28), device 10 may wirelessly receive content over link 26. Any suitable content may be synced with the device at step 86. For example, content that is associated with the ticket and the service associated with the ticket may be transferred. If, as an example, the ticket is for a plane flight, the content may be a movie that an airline is providing for free (or a fee) to the user for viewing during the flight.

In a typical scenario, a user may approach a ticketing counter at an airport before boarding a flight. Over the course of several minutes, the user may present identification, confirm an itinerary, and check baggage. Steps such as these are typically involved both in situations in which an airline attendant serves the user and in situations in which the user interacts directly with an "express" check-in terminal. During the check in process, several feature-length films and supplementary video programs can be transferred to device 10 (i.e., during step 86). By the time the user is ready to proceed to the airport's security checkpoint, a full entertainment package for the user's flight has been synced onto the user's device and is ready to view. If desired, the content that is provided at step 86 (or the sync steps in other usage scenarios) may expire, as indicated by step 88. Content may expire if it is not viewed or otherwise accessed within a given time period or before certain events occur (e.g., before a flight ends or is scheduled to end, just after a flight is scheduled to end, before a user leaves a store, before a certain date is reached, etc.).

If desired, host 28 may be implemented using equipment associated with a kiosk or equipment that has the attributes of a kiosk. For example, if the user of device 10 is checking in to an airline using a self-service terminal that is serving as host 28, the self-service terminal may display a menu of available programming choices for in-flight movies. These programming choices might be presented as part of the sequence of screens in which the user is invited to change seat assignments, update frequent flier information, and perform other travel-related actions. These capabilities make it possible for the self-service terminal to personalize the entertainment package that is provided to the customer at step 86 and make it possible for the user to access a larger content library than might be stored on each airplane. This type of approach may also help airline carriers reduce cost, because it is not necessary to equip each airline seat with a display when customers have their own devices 10. Even in scenarios in which the self-service terminal or other ticketing counter equipment provides content selection options, the overall time required for the check-in process need only increase marginally, if at all.

As these examples demonstrate, short-range, gigabit wireless communications using millimeter-wave links can be used to "hide" content syncing operations inside the everyday activities users already perform. By reducing transfer times for video content to a relatively small time period (e.g., 5-10 seconds or less), syncing can be made less obtrusive and can be used to provide additional value to users. By syncing opportunistically rather than requiring the user to take physical action, a mobile electronic device can more frequently acquire new and up-to-date content.

The foregoing is merely illustrative of the principles of this invention and various modifications can be made by those skilled in the art without departing from the scope and spirit of the invention.

What is claimed is:

1. A method for using millimeter-wave wireless communications links to synchronize content between a host and an electronic device associated with a user, comprising:
   with the electronic device,
      detecting proximity to the host by detecting that the electronic device has remained within a predetermined range of the host for a predetermined time;
      based on detecting proximity to the host, automatically establishing a millimeter-wave wireless communications link with the host; and
      when the millimeter-wave wireless communications link has been automatically established, automatically receiving content over the millimeter-wave wireless communications link that has been transmitted by the host.

2. The method defined in claim 1 wherein automatically receiving the content comprises:
   automatically forming a content request at the electronic device based on user content preferences; and
   transmitting the content request to the host.

3. The method defined in claim 2 further comprising:
   obtaining information on the user content preferences by presenting on-screen options on the electronic device to which the user responds.

4. The method defined in claim 2 further comprising:
   monitoring user media playback activities with the electronic device; and
   generating the user content preferences based on the monitored user media playback activities.

5. The method defined in claim 1 wherein automatically receiving the content comprises automatically receiving content transmitted by a beam steering array in the host.

6. The method defined in claim 1 wherein automatically establishing the millimeter-wave communications link comprises using the electronic device to receive beacon signals from the host.

7. The method defined in claim 6 further comprising:
   with the electronic device, evaluating received beacon signals from the host to determine whether the host has synchronization capabilities.

8. The method defined in claim 1 further comprising:
   validating the received content at the electronic device.

9. The method defined in claim 8 wherein validating the received content comprises checking digital rights management credentials.

10. The method defined in claim 1 further comprising authenticating to the host with the electronic device when establishing the millimeter-wave wireless communications link.

11. The method defined in claim 1 wherein automatically receiving the content comprises receiving songs from the host at the electronic device.

12. The method defined in claim 1 wherein the host comprises a personal computer associated with the user and wherein automatically receiving the content comprises receiving songs from the personal computer at the electronic device.

13. The method defined in claim 1 wherein the host comprises a point-of-sale terminal associated with a store and wherein automatically receiving the content comprises receiving promotional content from the point-of-sale terminal at the electronic device.

14. The method defined in claim 1 wherein the host comprises a point-of-sale terminal associated with a store at which the user is making a purchase and wherein automatically receiving the content comprises receiving promotional content from the point-of-sale terminal at the electronic device while the user is making the purchase at the point-of-sale terminal.

15. The method defined in claim 1 wherein the host comprises ticketing equipment that issues a ticket for the user and wherein automatically receiving the content comprises receiving content from the ticketing equipment at the electronic device.

16. The method defined in claim 1 wherein the host comprises ticketing equipment that issues a ticket for the user and wherein automatically receiving the content comprises receiving video from the ticketing equipment over the millimeter-wave wireless communications link at the electronic device while the ticket is being issued for the user.

17. The method defined in claim 1 wherein the host comprises ticketing equipment that issues an airline ticket for the user and wherein automatically receiving the content comprises receiving at least one movie from the ticketing equipment over the millimeter-wave wireless communications link at the electronic device while the airline ticket is being issued for the user at the ticketing equipment.

18. The method defined in claim 1 wherein the millimeter-wave wireless communications link is associated with a 60 GHz communications band, the method further comprising detecting that the electronic device is within less than 1 meter of the host before establishing the millimeter-wave wireless communications link.

19. A method for transmitting content from a host to an electronic device over a millimeter-wave wireless communications link, comprising:

at the host, detecting that the electronic device is in proximity to the host by detecting that the electronic device has remained within a predetermined range of the host for a predetermined time;

at the host, upon detecting that the electronic device is in proximity to the host, automatically establishing a millimeter-wave wireless communications link with the electronic device;

at the host, receiving a content request from the electronic device over the millimeter-wave wireless communications link; and in response to the received content request, automatically transmitting associated files from the host to the electronic device over the millimeter-wave wireless communications link.

20. The method defined in claim 19 further comprising:

at the host, transmitting wireless beacons, wherein the wireless beacons comprise information about files that are available at the host for automatic transfer to the electronic device over the millimeter-wave wireless communications link.

\* \* \* \* \*